US012751415B2

(12) United States Patent
Brown et al.

(10) Patent No.: US 12,751,415 B2
(45) Date of Patent: Oct. 6, 2026

(54) TEAT CUP LINER, APPARATUS INCLUDING THE SAME, AND METHODS OF MAKING AND USING THE SAME

(71) Applicants: Stanley Brown, Visalia, CA (US); Jason Legassick, Manchester, IA (US)

(72) Inventors: Stanley Brown, Visalia, CA (US); Jason Legassick, Manchester, IA (US)

(73) Assignee: Beco Dairy Automation Inc., Hanford, CA (US)

( * ) Notice: Subject to any disclaimer, the term of this patent is extended or adjusted under 35 U.S.C. 154(b) by 911 days.

(21) Appl. No.: 17/219,418

(22) Filed: Mar. 31, 2021

(65) Prior Publication Data

US 2022/0312719 A1 Oct. 6, 2022

(51) Int. Cl.
*A01J 5/08* (2006.01)

(52) U.S. Cl.
CPC .................................... *A01J 5/08* (2013.01)

(58) Field of Classification Search
CPC ........ A01J 5/08; A01J 5/06; A01J 5/16; A01J 5/041; A01J 5/04
USPC .......... 119/14.01, 14.02, 14.38, 14.47–14.54
See application file for complete search history.

(56) References Cited

U.S. PATENT DOCUMENTS

| | | | | |
|---|---|---|---|---|
| 3,234,906 A * | 2/1966 | Villy | A01J 5/06 | 119/14.32 |
| 6,631,694 B1 * | 10/2003 | Chowdhury | A01J 5/08 | 119/14.46 |
| 6,776,120 B1 * | 8/2004 | Chowdhury | A01J 5/08 | 119/14.47 |
| 8,176,873 B2 * | 5/2012 | Shin | A01J 5/08 | 119/14.47 |
| 8,375,894 B2 * | 2/2013 | Chowdhury | A01J 5/08 | 119/14.47 |
| 8,627,785 B2 * | 1/2014 | Grace | A01J 5/08 | 119/14.47 |
| 9,204,616 B2 * | 12/2015 | Chowdhury | A01J 7/00 | |

(Continued)

OTHER PUBLICATIONS

Pranay Bharti et al.; "Relationship of Udder and Teat Conformation With Intra-Mammary Infection in Crossbred Cows Under Hot-Humid Climate"; Veterinary World, vol. 8; Jul. 2015; pp. 898-901.

(Continued)

*Primary Examiner* — Kimberly S Berona
*Assistant Examiner* — Kevin M Dennis
(74) *Attorney, Agent, or Firm* — Andrew D. Fortney; Central California IP Group, P.C.

(57) ABSTRACT

A teat cup liner is disclosed that includes an attachment section having an opening therein, a barrel joined to and in fluid communication with the attachment section, and a tube section, joined to and in fluid communication with the barrel. The barrel includes a transition section and a triangular section. A combined length of the attachment section and the transition section is (i) from 5.5 to 8.5 cm long, (ii) an average teat length (after elongation), optionally minus a minimum uniform pressure length, ±20%, or (iii) 40-65% of a combined length of the attachment section and the barrel. Alternatively, the transition section has a surface with a slope of less than 0.3, where the slope is defined by a change in the radius of the barrel in the transition section relative to the length of the transition section. The tube section includes a connection mechanism.

22 Claims, 5 Drawing Sheets

(56) References Cited

U.S. PATENT DOCUMENTS

| | | | | |
|---|---|---|---|---|
| 9,247,708 | B2 * | 2/2016 | Kochman | A01J 5/041 |
| 9,288,962 | B2 * | 3/2016 | Priest | A01J 5/08 |
| 9,408,367 | B2 * | 8/2016 | Alveby | A01J 5/08 |
| 10,681,896 | B2 * | 6/2020 | Happel | A01J 5/08 |
| 10,785,952 | B2 * | 9/2020 | Hedlund | A01J 5/08 |
| 11,330,791 | B2 * | 5/2022 | Rajasekaran | A01J 5/08 |
| 2009/0084319 | A1 * | 4/2009 | Sellner | A01J 5/08<br>119/14.47 |
| 2009/0308320 | A1 * | 12/2009 | Shin | A01J 5/08<br>119/14.49 |
| 2012/0042830 | A1 * | 2/2012 | Shin | A01J 5/08<br>119/14.49 |
| 2013/0125822 | A1 * | 5/2013 | Chowdhury | A01J 5/08<br>119/14.49 |
| 2014/0318461 | A1 * | 10/2014 | Chowdhury | A01J 5/08<br>119/14.47 |
| 2015/0040830 | A1 * | 2/2015 | van Leeuwen | A01J 5/0075<br>119/14.02 |
| 2016/0198672 | A1 * | 7/2016 | Chowdhury | A01J 7/00<br>119/14.49 |
| 2017/0164575 | A1 * | 6/2017 | Alveby | A01J 5/08 |

OTHER PUBLICATIONS

J.F. Guarin et al.; "Association of Anatomical Characteristics of Teats With Quarter-Level Somatic Cell Count"; Journal of Dairy Science, vol. 100 No. 1; 2017; pp. 643-652.

D. Weiss et al.; "Teat Anatomy and Its Relationship With Quarter and Udder Milk Flow Characteristics in Dairy Cows"; Journal of Dairy Science, vol. 87 No. 10; 2004; pp. 3280-3289.

I. Zwertvaegher et al.; "Variance Components of Teat Dimensions in Dairy Cows and Associated Factors"; Journal of Dairy Science, vol. 95 No. 9; 2012; pp. 4978-4988.

* cited by examiner

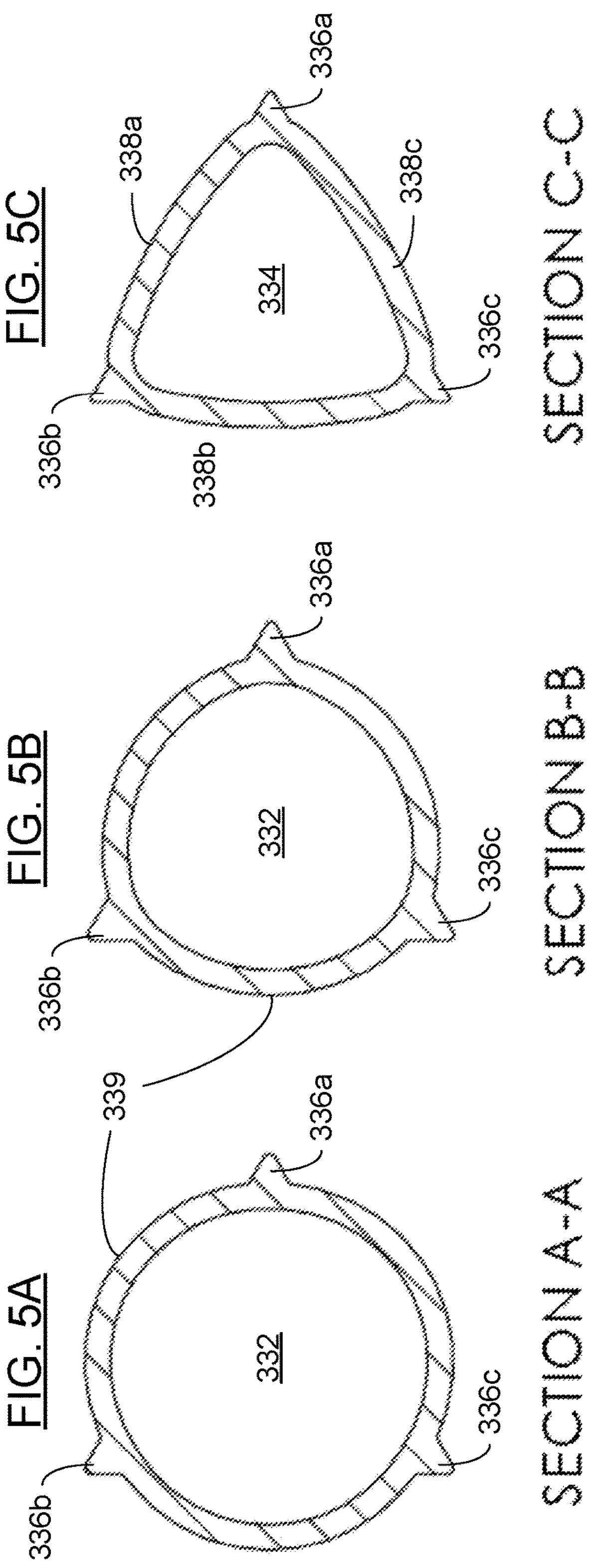
FIG. 5C
336a
338a
338c
334
336c
336b
338b
SECTION C-C
FIG. 5B
336a
332
336c
336b
SECTION B-B
339
FIG. 5A
336a
332
336c
336b
SECTION A-A
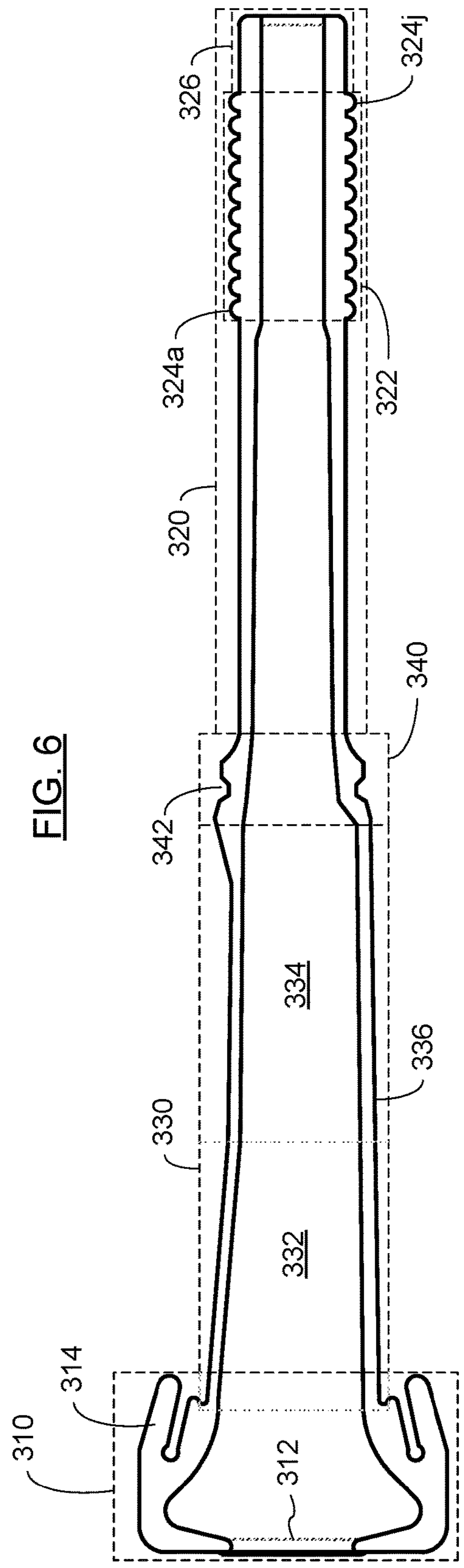
FIG. 6
326
324j
324a
322
320
340
342
334
330
336
332
314
310
312

TEAT CUP LINER, APPARATUS INCLUDING THE SAME, AND METHODS OF MAKING AND USING THE SAME

FIELD OF THE INVENTION

The present invention generally relates to the field of milking equipment and methods. More specifically, embodiments of the present invention pertain to a teat cup liner and methods for making and using the same.

DISCUSSION OF THE BACKGROUND

FIG. 1 is a diagram showing a conventional teat cup liner 100 according to U.S. Pat. No. 8,375,894. The liner 100 is used in a milking assembly (not shown) for milking a mammal such as a cow. The teat of the mammal extends into the liner 100 through the opening (not shown) in the attachment section or end 110. The liner 100 is typically rubber, a rubber blend, or another flexible material. The ribbed end 122 of the tube section 120 of the liner 100 provides a mechanism for connection to a milking claw (not shown), which in turn supplies milk to a storage vessel. Vacuum is continuously applied inside the liner 100 (e.g., through the tube section 120), and vacuum is alternately and cyclically applied to a chamber in the milking assembly to open and close the barrel section 130 of the liner 100 below the teat. An air vent plug (not shown) may be inserted through the wall of the tube section 120 of the liner 100.

FIG. 2 shows an isometric view of another teat cup liner 200 according to U.S. Pat. No. 8,375,894, in which the barrel 230 has a transition section 232 with a round lateral cross-section (see cross-section P-P in FIG. 3), taken transversely to axial direction 250, and a triangular section 234 with a triangular lateral cross-section taken transversely to axial direction 250 (see cross-sections U-U and V-V in FIG. 3). Ribs 236 extend longitudinally from at least the transition section 232 to at least the triangular section 234. The ribs 236 extend laterally from the corners of the triangular cross-section.

FIG. 3 illustrates a longitudinal cross-section of the teat cup liner 200, which has a mouthpiece or attachment section 210, a barrel 230, and a connecting tube 220. The barrel 230 extends along the axial direction for receiving the teat inserted axially thereinto through the mouthpiece 210. The mouthpiece 210 has a lip with an aperture 212 therethrough for receiving the teat. Cross-sections of the liner 200 are provided at various locations (e.g., along O-O, P-P, Q-Q, and R-R) along the length of the liner 200.

The design of the teat cup liner 200 in FIGS. 2-3 is an improvement over the teat cup liner 100 in FIG. 1. For example, the barrel 130 in the teat cup liner 100 collapses in two substantially opposite directions under application of an internal vacuum. This results in a strong application of the vacuum to the teat, but the pressure of the liner 100 on the teat is not uniform, particularly where the two opposed parts of the barrel 130 meet. On the other hand, the triangular section 234 of the barrel 230 collapses in three directions under application of an internal vacuum, resulting in more uniform or evenly-distributed pressure on the teat. However, small gaps may form in the collapsed triangular section 234, and the internal vacuum may be applied to the upper part of the teat and/or a part the udder immediately adjacent to the teat, neither of which is desirable for maintaining optimal health and well-being of the cow.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a teat cup liner, comprising an attachment section (e.g., a mouthpiece or cup), a barrel joined to and in fluid communication with the attachment section, and a tube (or connection) section, joined to and in fluid communication with the barrel. The barrel comprises a transition section and a triangular section, and the tube section includes a connection mechanism. The combined length of the attachment section and the transition section of the barrel (i) is from 5.5 to 8.5 cm long, (ii) has a length that is an average teat length (after elongation), optionally minus a minimum uniform pressure length, ±20%, or (iii) is 40-65% of the total length of the combined attachment section and barrel. Alternatively, the transition section of the barrel has a surface with a slope of less than 0.3, where the slope is defined by a change in the radius of the barrel in the transition section relative to the length of the transition section.

For example, the average teat length in certain breeds of dairy cows is from 47 mm (hind teats) to 54 mm (front teats). Thus, assuming an elongation of 50% during milking, some minimal overlap or contact between the triangular section of the barrel and the teat end (the "minimum uniform pressure length"), and optionally some cow-to-cow variation in teat length, the combined length of the attachment section and the transition section of the teat cup liner may be 6.3-7.7 cm, or alternatively, 7.0 cm±10%. Assuming a combined attachment section and barrel length of 13.5 cm, the combined length of the attachment section and the transition section of the teat cup liner may be 48-57% of the combined length of the attachment section and barrel. The slope of the transition section may also be less than 0.2 in such examples. In even more ideal examples, the combined length of the attachment section and the transition section of the teat cup liner may be 6.4-7.1 cm, or 50-53% of the combined length of the attachment section and barrel.

Looking at it another way, the combined length of the attachment section and the transition section of the teat cup liner may be according to the formula $L=(X*Y)-Z$, where L is the combined length of the attachment section and the transition section of the teat cup liner, X is the average teat length, Y is an elongation factor (e.g., a predetermined ratio of teat elongation during milking relative to the teat at rest), and Z is the minimum uniform pressure length. In general, the minimum uniform pressure length is a predetermined length that represents the amount (i.e., length) of the end of an average-length teat that should extend into the triangular section during elongation/milking. For cows, X is typically between 35 and 60 mm (e.g., 45-55 mm, or any length or range of lengths between 35 and 60 mm, inclusive), Y is 1.4-1.6 (e.g., about 1.5), and Z is 3-15 mm (e.g., 5-10 mm, or any length or range of lengths between 3 and 15 mm, inclusive). X, Y and Z can be determined empirically for a given breed of cow, optionally in a given market, region or jurisdiction (e.g., the U.S., California, Wisconsin, Iowa, Belgium, Germany, Australia, etc.), as well as for different mammals (e.g., goats, sheep, camels, yaks, buffaloes, horses, donkeys, etc.) and types or breeds thereof. Thus, in other embodiments, Y may be at least 1.3, Z is the minimum uniform pressure length, and Z may be at least 1 mm.

In various embodiments, the transition section has (i) a circular or substantially circular cross-section at an interface with the attachment section and (ii) a triangular or substantially triangular cross-section at an interface with the triangular section. The triangular section generally has a substantially triangular cross-section, and may consist essentially of three substantially planar triangular regions or walls, each at about a 120° angle relative to the other two substantially planar triangular regions or walls. In some such embodiments, the barrel of the teat cup liner further comprises three ribs. Each of the three ribs is between two of the three substantially planar triangular regions (i.e., a first rib is between first and second substantially planar triangular regions, a second rib is between the second substantially planar triangular region and a third substantially planar triangular region, and a third rib is between the first and the third substantially planar triangular regions).

Generally, the teat cup liner has a central axis along a length thereof, and each of the attachment section and the tube section may have an interior that is radially symmetrical about the central axis. The attachment section may comprise a teat contact section and a lip extending from an outermost circumferential surface of the teat contact section. The teat contact section may have a cross-section (e.g., taken such that the central axis of symmetry is in the cross-sectional plane) that is cylindrical, toroidal, conical, bell-shaped, or a combination thereof. The lip may be configured to secure the teat cup liner to a corresponding teat cup shell. Furthermore, the barrel may have (i) a first interface with the attachment section that is coplanar with a lowermost surface or edge of the lip, and/or (i) a second interface with the triangular section that is within 10% of a midpoint along a length of the teat cup liner. In some examples, the transition section may have an inner diameter at the first interface that is greater than a diameter of the tube section between the second interface and the connection mechanism. In other or further examples, the diameter of the tube section between the second interface and the connection mechanism may be greater than the diameter of the tube section at the connection mechanism. In some embodiments, the teat cup liner may have a circumferential groove in an exterior surface at the second interface. The circumferential groove may be configured to receive an edge of the corresponding teat cup shell.

In various embodiments, the attachment section may have a length of from 25 to 50 mm, the barrel may have a length of from 80 to 120 mm, the tube section may have a length of from 120 to 180 mm, and the teat cup liner may have a length of from 240 to 350 mm. Any of these sections of the teat cup liner may have any length or range of lengths within these ranges, but the invention is not so limited (especially for mammals other than cows). In other or further embodiments, the lengths of the transition section and the triangular section equals the length of the barrel.

In further aspects, the present invention also concerns a teat cup and a milking claw, comprising the present teat cup liner. The teat cup further includes a teat cup shell, configured to securely and sealingly hold the teat cup liner therein and apply and/or release a vacuum to an exterior of the teat cup liner. The milking claw includes a plurality of the teat cups and a manifold. The manifold may be configured to receive a fluid from the tube section of each of the teat cup liners and combine the fluid into a single output flow.

Still further aspects of the present invention concern methods of making the teat cup liner and of milking a milk-producing mammal. The method of making the teat cup liner may comprise (a) injecting a rubber material into a mold having a shape of the teat cup liner, (b) heating or otherwise vulcanizing the rubber material in the mold, and (c) releasing the vulcanized rubber material in the shape of the teat cup liner from the mold. The method of milking a milk-producing mammal may comprise (i) applying a teat cup having the present teat cup liner therein to a teat of the mammal, (ii) applying a continuous vacuum to an interior of the tube section, and (iii) applying a pulsed or periodic vacuum to an exterior of the teat cup liner. In further embodiments, the method of milking a milk-producing mammal applies a plurality of such teat cups to the teats of the mammal. In preferred embodiments, the mammal is a cow, and the number of teats is four, but the invention is not so limited.

The present invention advantageously increases the length of the transition section of the teat cup liner and decreases the change in inner diameter as a function of the depth of the teat cup liner (in the transition section), relative to the teat cup liner 200 in FIG. 2. This difference enables the upper part of the barrel to effectively collapse around the teat during milking, while at the same time applying a relatively uniform pressure to the far end of the teat. The present teat cup liner effectively decouples the milking vacuum from the uppermost part of the teat closest to the mammal's skin, and reduces the incidence of lesions and infections in the uppermost part of the teat and the mammal's skin around the teat. These and other advantages of the present invention will become readily apparent from the detailed description of various embodiments below.

BRIEF DESCRIPTION OF THE DRAWINGS

FIGS. 5A-C show cross-sections of the exemplary teat cup liner of FIG. 4 at various locations.

FIG. 6 is a graph showing the cross-sectional, lengthwise profile of the teat cup liner of FIGS. 2-3, including the transition section.

DETAILED DESCRIPTION

Figure 1:
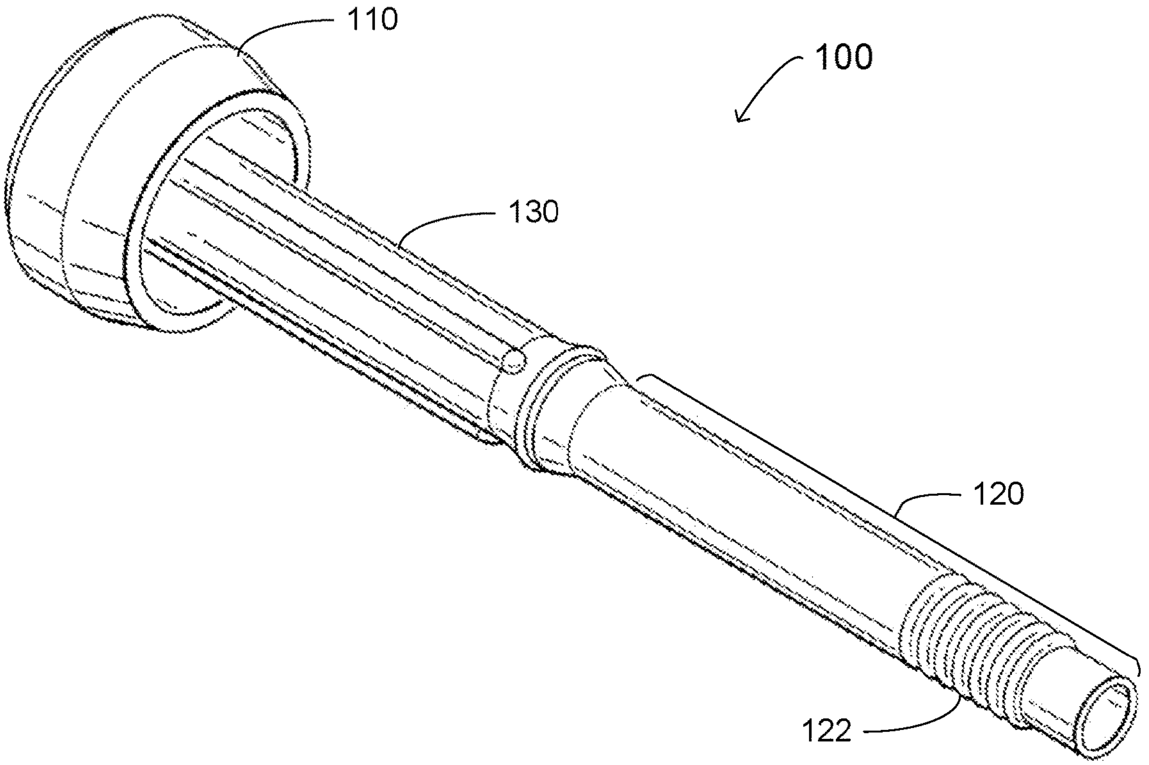
FIG. 1 is a diagram showing a teat cup liner according to U.S. Pat. No. 8,375,894.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

For the sake of convenience and simplicity, the terms "connected to," "coupled with," "coupled to," "joined to," "attached to," "fixed to," "affixed to," "in communication with," and grammatical variations thereof may be used interchangeably, and refer to both direct and indirect connections, couplings, joints, attachments and communications (unless the context of its use unambiguously indicates otherwise), but these terms are generally given their art-recognized meanings.

The terms "lower" and "upper" are used herein as convenient labels for the same or similar structures having a relative position to the other(s) as shown in the drawings, but which can change their relative position(s) depending on the orientation of the apparatus or other structure in the drawing(s). Similarly, the terms "downstream" and "upstream" are convenient labels for relative positions of two or more components of the apparatus with respect to the flow of fluid(s) within the apparatus.

The present invention concerns an improved version of the teat cup liners disclosed in U.S. Pat. No. 8,375,894. The present teat cup liner includes an elongated transition section of the barrel, below the attachment section. The transition section of the present teat cup liner is significantly longer, and has a radius or diameter that changes significantly more gradually, than the transition section of the teat cup liner 200 in U.S. Pat. No. 8,375,894. These differences enable the present teat cup liner to apply a relatively uniform pressure to the end of the teat (where needed), while at the same time allowing a greater length of the upper part of the barrel of the liner to collapse around the teat during milking, thereby effectively decoupling the vacuum at the end of the teat from the uppermost part of the teat, closest to the mammal's skin, and reducing the incidence of lesions and infections in the uppermost part of the teat and the mammal's skin around the teat.

The invention, in its various aspects, will be explained in greater detail below with regard to exemplary embodiments.

An Exemplary Teat Cup Liner

Figure 4:
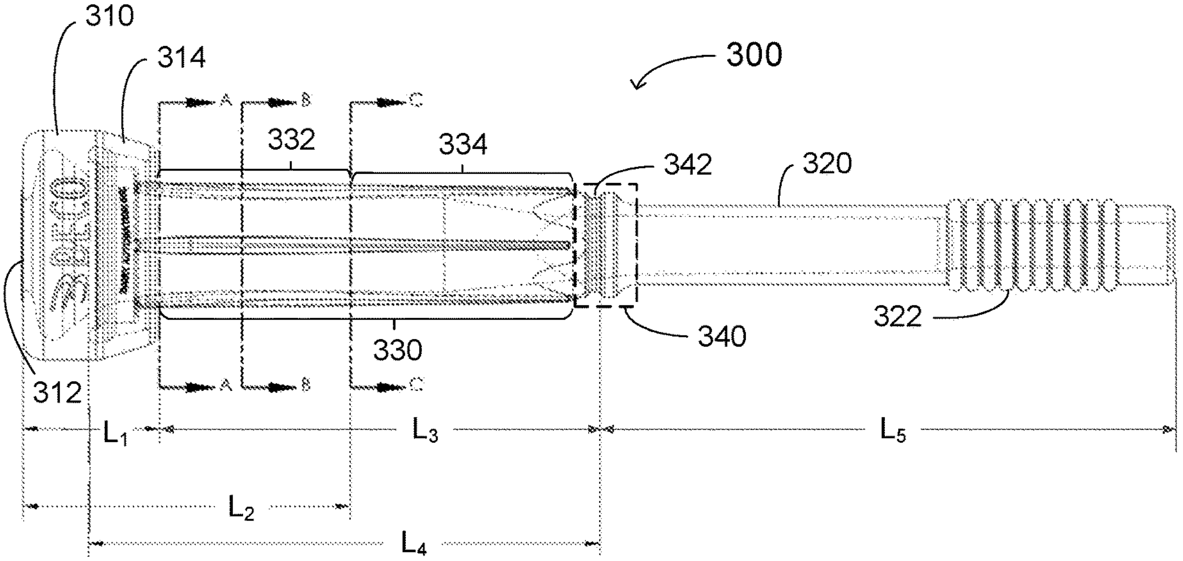
FIG. 4 shows an exemplary teat cup in accordance with one or more embodiments of the present invention.

In one aspect, the present invention relates to a teat cup liner. FIGS. 4 and 6 show an exemplary embodiment of the present teat cup liner 300, including an attachment section 310 with an opening 312 therein and a lip 314, a tube or connection section 320 including a connection mechanism 322, and a barrel 330. The barrel 330 includes a transition section 322 and a triangular section 334. The teat cup liner 300 also includes an interface 340 between the barrel 330 and the connection section 320. A groove 342 is in exterior surface of the teat cup liner 300 at the interface 340. The lip 314 and the groove 342 secure the teat cup liner 300 onto beads along edges of a corresponding teat cup shell.

The attachment section 310 (which may also be known as a cup or a mouthpiece) generally contacts the mammal's skin when the mammal's teat is placed in the opening 312. Thus, the opening 312 is circular or substantially circular, and has a diameter of from 10 to 50 mm, depending on the mammal. When the mammal is a cow, the opening 312 is generally about 20-25 mm in diameter. The length $L_1$ of the attachment section 310 is generally 25 to 50 mm, but the invention is not so limited. However, when the mammal is a cow, the length L1 of the attachment section 310 may be 30-40 mm (e.g., about 35 mm).

The barrel 330 is generally the section of the teat cup liner 300 from the end (e.g., the lowermost edge) of the attachment section 310 to the tube section 320. As shown in FIG. 4, the point at which the barrel 330 and the tube section 320 meet is at the edge of the groove 342 away from the attachment section 310 and closest to the connection mechanism 322 (e.g., the lowermost edge), but it can also be located at other points, such as at the midpoint or uppermost edge of the groove 342, the lengthwise point along the inner surface of the triangular section 334 away from the attachment section 310 where the inner diameter decreases, etc. The barrel 330 may have a length $L_3$ of from 80 to 120 mm, depending on the mammal, but the invention is not so limited. However, when the mammal is a cow, the length $L_3$ of the barrel 330 may be 90-110 mm (e.g., about 10 cm).

The triangular section 334 has a triangular or substantially triangular cross-section throughout substantially its entire length, and may consist essentially of three substantially planar triangular regions or walls, each at about a 120° angle relative to the other two substantially planar triangular regions or walls. Referring to FIG. 5C, which shows a cross-section of the teat cup liner 300 of FIG. 4 along the line C-C, the substantially triangular cross-section of the triangular section 334 is shown. The triangular section 334 includes three substantially planar triangular regions or walls 338*a-c* (see also FIG. 6), each at about a 120° angle relative to each other, and separated from each other by a rib 336*a-c* that extends along the length of the barrel 330. The walls 338*a-c* may have a width of 15-25 mm or any width or range of widths therein (e.g., 20-22 mm), and a length of 40-70 mm or any length or range of lengths therein (e.g., 50-60 mm), but the invention is not limited to these values.

Referring back to FIG. 2, the walls of the triangular section 234 of the teat cup liner 200 is planar or substantially planar, and includes ribs 236 on opposite sides thereof along the length direction. On the opposite side of each rib 236, there is another substantially planar triangular region (not shown), at about a 120° angle relative to the substantially planar triangular region 234. A third rib (not shown) is between the unshown substantially planar triangular regions on the opposite side of the liner 200. Similar structures are present in the triangular section 334 of the teat cup liner 300 in FIG. 4.

Figure 2:
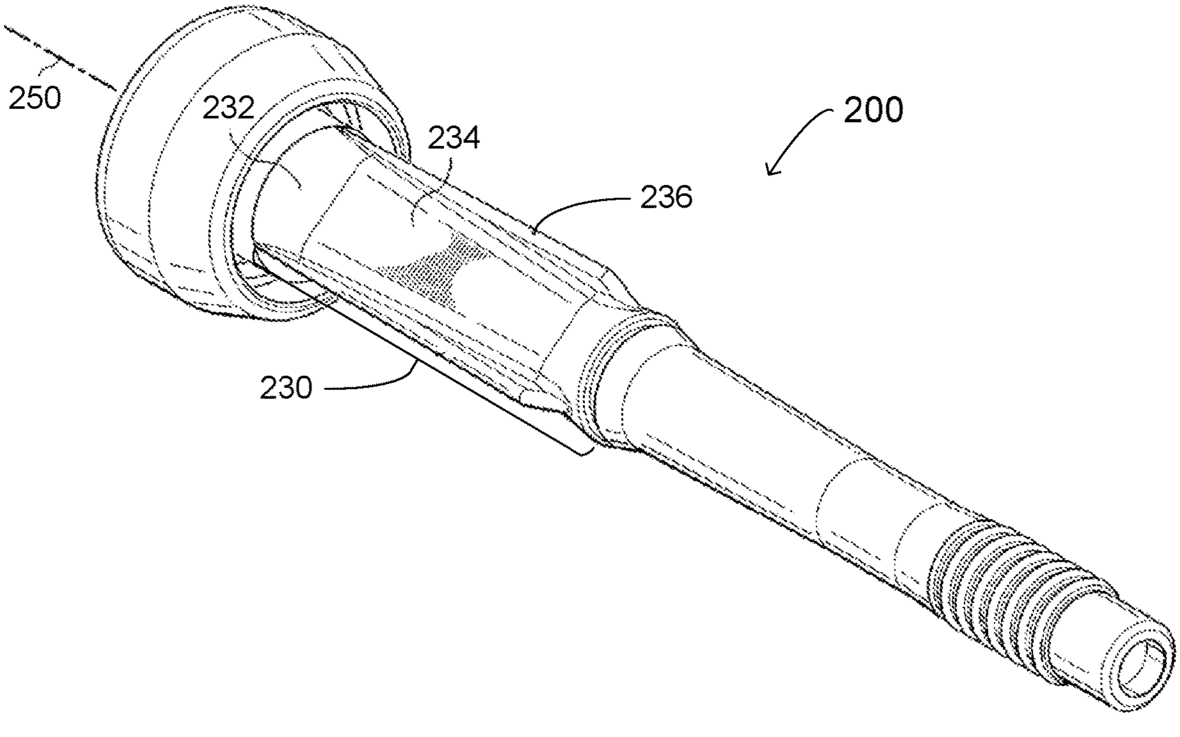
FIGS. 2-3 are diagrams of an alternative teat cup liner according to U.S. Pat. No. 8,375,894.

The transition section 332 of the teat cup liner 300 is significantly longer and more gradual than the transition section 232 of the teat cup liner 200 in FIG. 2. This difference enables the present teat cup liner 300 to apply a relatively uniform pressure to the end of the teat, while at the same time allowing a greater length of the upper part of the barrel to collapse around the teat during milking, thereby effectively decoupling the vacuum from the uppermost part of the teat, closest to the mammal's skin, and reducing the incidence of lesions and infections in the uppermost part of the teat and the mammal's skin around the teat. It is advantageous to measure the length of the transition section as the combined length of the attachment section 310 (i.e., the mouthpiece) and the transition section 332, rather than simply the transition section 332 itself, because the function of the transition section 332 is to compress the teat along center part of the teat, preferably as much of the center part of the teat as possible, without significantly increasing the likelihood of causing damage to the uppermost part of the teat, but while still allowing a vacuum to be uniformly applied to the end of the teat. As mentioned above, the triangular section 334 applies the vacuum to the teat more uniformly than does a section of the barrel with a circular or substantially circular cross-section (such as in the transition section 332; see, e.g., FIGS. 5A-B, which are respectively the cross-sections of the teat cup liner 300 in FIG. 4 along lines A-A and B-B), but in the teat cup liner 200 in FIG. 2, the vacuum can inadvertently be applied to higher parts of the teat through a leak in the triangular section 234 of the barrel 230 (e.g., under one or more of the ribs 236). The additional length of the transition section 332 enables the barrel 330 to collapse more completely around the teat in the center of the teat, preventing leaks of the vacuum from inadvertently being applied to upper parts of the teat. Because of the relatively short length and relatively steep change of inner diameter in the transition section 232, the teat cup liner 200 in FIG. 2 is less effective than the present teat cup liner (e.g., liner 300 in FIG. 4) at completely collapsing around the teat.

In various embodiments, the combined attachment section 310 and transition section 332 of the present teat cup liner 300 is from 5.5 to 8.5 cm long, or any length or range of lengths therein (e.g., 6.3-7.7 cm, and in one example, 7.0 cm). Alternatively, the combined attachment section 310 and transition section 332 of the present teat cup liner 300 may have a length of 7.0 cm±20%, or any percentage or range of percentages therein (e.g., ±10%), although the center point (7.0 cm) of this percentage variance of length may differ, depending on the species and/or breed of the mammal.

In another alternative approach, the combined attachment section 310 and transition section 332 has a length that is 40-65% (or any percentage or range of percentages therein) of the total length of the combined attachment section 310 and barrel 330. For example, the teat cup shells of milking apparatuses tend to have standardized dimensions, either for a certain mammal (e.g., cow, sheep, goat, etc.) or a certain breed (e.g., Holstein, Jersey, Brown Swiss, Guernsey, Ayrshire, Shorthorn, etc.), and the combined lengths of the attachment section 310 and barrel 330 tend to match the standardized length of teat cup shells. In one example, the standardized length of teat cup shells is about 12.5 cm (±0.1-0.2 cm). A corresponding length for the combined attachment section and barrel of the teat cup liner may be about 13.0-13.5 cm, although it is not limited to this example. When the present teat cup liner is designed or made to match a teat cup shell with a standardized length, the combined attachment section 310 and transition section 332 may have a length that is 40-65% (or any percentage or range of percentages therein, such as 48-57%, and in one example, about 52-53%) of the total length of the combined attachment section 310 and barrel 330.

Looking at the length of the transition section 332 another way, the combined attachment section 310 and transition section 332 of the present teat cup liner 300 may be an average teat length (after elongation) of the mammal, optionally minus a minimum uniform pressure length, ±20%. For example, the average teat length in certain breeds of dairy cows may be from 38 mm to 60 mm, and more commonly, from 47 mm to 54 mm. In cows, the hind teats are generally shorter than the front teats, although the teat cup shells and teat cup liners for a given milking apparatus may not have different lengths (e.g., they may have standardized or identical dimensions). Thus, the teat cup liners may be designed to have a length that is generally acceptable for all or substantially all teat lengths, regardless of variance within a species, breed, or group (e.g., herd) of mammals (e.g., cows), or even on a particular animal (e.g., cow).

Generally, teats elongate during milking. The ratio of teat elongation during milking relative to the same teat at rest may be termed the "elongation factor." Different species and breeds, and even different teats on a particular animal, will elongate by different amounts, and the same teat on the same animal may elongate by a different amount, depending on the particular phase or stage of the lactation cycle. As a result, one may assume that an average teat in a given population elongates by an average amount during milking. For dairy cows in the U.S., the average teat elongation may be about 50%, although the percentage may differ for a particular breed, geographic region or herd. The teats of different animals (e.g., sheep, goats, camels, etc.) may have a different average elongation. Typically, however, average teat elongation is generally in the range of 30-70% (i.e., the average elongation factor is 1.3-1.7).

In addition, some minimal overlap or contact between the triangular section 334 of the barrel 330 and the teat end may be desirable. This minimal overlap or contact region is termed "minimum uniform pressure length" herein, and for dairy cows, this minimum uniform pressure length may be from 0.3 cm to 1.0 cm. In one example, it is about 0.6 cm, although the invention is not limited to this value. To ensure that a larger percentage of teat ends overlap with or extend into the triangular section 334 of the barrel 330, the minimum uniform pressure length may be increased or offset (e.g., by moving the interface between the transition section 332 and the triangular section 334 towards the attachment section 310) by a predetermined distance, in part to account for breed-to-breed, herd-to-herd, animal-to-animal, and even intra-animal variations in teat length and elongation behavior. The length of the offset may be from 0.1 to 1.0 cm, depending on the mammal and/or breed.

In one example involving U.S. dairy cows, the average teat length was determined to be about 5.0 cm, and the average elongation during milking was 50%. Consequently, for this example, the combined length of the attachment section 310 and the transition section 332 of the teat cup liner 300 may be 6.5-7.2 cm. Thus, more generally, the combined length L of the attachment section 310 and the transition section 332 may be (X*Y)−Z, where X is the average teat length, Y is the elongation factor, and Z is the minimum uniform pressure length. For cows, X is typically between 35 and 60 mm (e.g., 45-55 mm, or any length or range of lengths between 35 and 60 mm, inclusive), Y is about 1.5 (e.g., 1.4-1.6), and Z is 3-15 mm (e.g., 5-10 mm, or any length or range of lengths between 3 and 15 mm, inclusive). X, Y and Z can be determined empirically for a given species, and optionally, breed of mammal. In a further option, X, Y and Z can be determined empirically for the species and/or breed in a given market, region or jurisdiction, as explained herein.

Alternatively, the transition section 332 of the barrel 330 has a surface (e.g., an inner surface) with a slope of less than 0.3, where the slope is defined by a change in the radius (e.g., the radius to the inner surface) of the barrel 330 in the transition section 332 relative to the length of the transition section 332. In this case, the radius to the inner surface of the transition section 332 is to a point or line along the inner surface of the transition section 332 that is equidistant from the nearest adjacent ribs 336 or along a center line in the walls 339 of the transition section 332 along the length direction. In some examples, the slope of the transition section 332 may also be less than 0.2. In general, the slope of the transition section 332 is ≥0.05. Alternatively, the slope of the surface of the transition section 332 may represent a graduation or narrowing of the diameter (e.g., an inner diameter) of the transition section 332 as a function of the length (e.g., $L_3$) of the barrel 330, from the attachment section 310 to the tube section 320. This graduation or narrowing of the diameter of the transition section 332 is twice the slope of the surface of the transition section 332.

Figure 3:
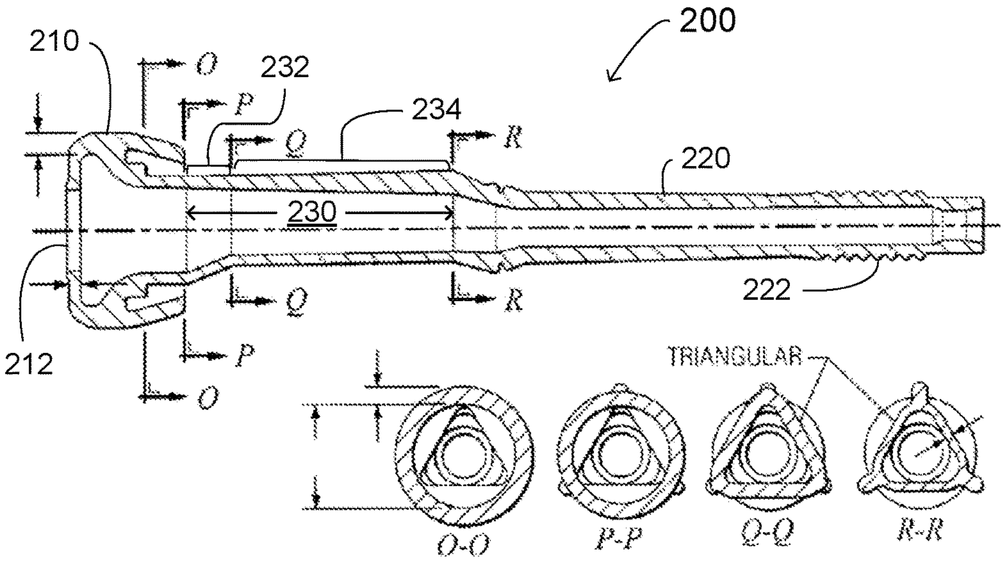
Figure 7:
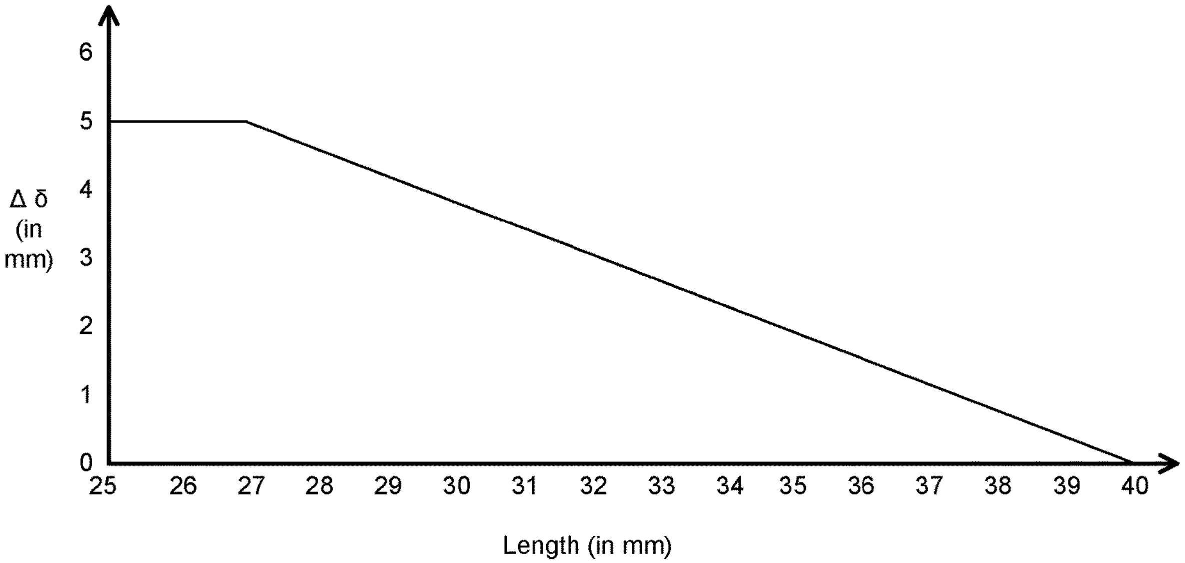
FIG. 7 is a graph showing the profile of the transition section of the teat cup liner of FIGS. 2-3.
Figure 8:
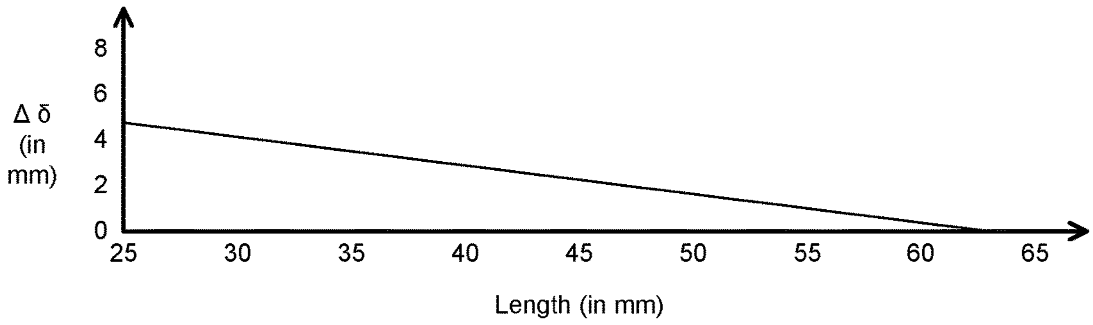
FIG. 8 is a graph showing the profile of the transition section of the exemplary teat cup liner of FIG. 4 according to an embodiment of the present invention.
Figure 9:
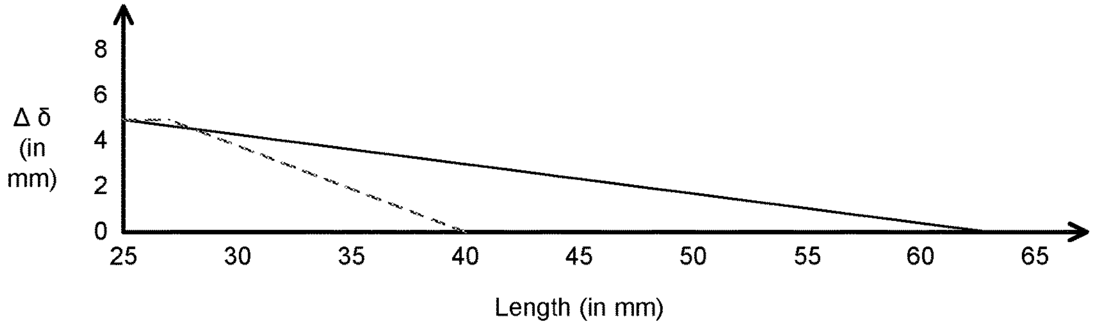
FIG. 9 is a graph comparing the profile of the transition section of the teat cup liner of FIG. 4 with the profile of the transition section of the teat cup liner of FIGS. 2-3.

FIGS. 7-9 are graphs showing the profiles of the transition sections of the teat cup liner 200 of FIGS. 2-3 (FIG. 7) and of the exemplary teat cup liner 300 of FIGS. 4 and 6 (FIG. 8), as well as a comparison of the two teat cup liner transition section profiles (FIG. 9). Referring to FIG. 7, the teat cup liner 200 has a radius that is 5 mm greater at a length along the central axis of the teat cup liner 200 (i.e., a distance from the outermost edge or plane of the opening 212; see FIG. 3) of 25 mm than it is at a length along the central axis of the teat cup liner 200 of 40 mm (i.e., the interface between the transition section 232 and the triangular section 234). The 5 mm greater radius of the transition section 232 extends to a length of 27 mm along the central axis of the liner 200. Thus, the slope of the teat cup liner 200 profile in the transition section 232 (e.g., relative to the central axis of the teat cup liner 200) is (5 mm/[40 mm−27 mm])=0.38.

However, as is shown in FIG. 8, the exemplary teat cup liner 300 of FIGS. 4 and 6 has a radius that is 5 mm greater at a length along its central axis of 25 mm than it is at a length of 62 mm along its central axis (i.e., at the interface between the transition section 332 and the triangular section 334). The 5 mm greater radius of the transition section 332 decreases immediately as the length along the central axis of the liner 300 increases. Thus, the slope of the teat cup liner 300 profile in the transition section 332 (e.g., relative to the central axis of the teat cup liner 300) is (5 mm/[62 mm−25 mm])=0.14.

The difference in the slopes/profiles of the transition sections 232/332 of the two different teat cup liners 200 and 300 is seen more clearly in FIG. 9, where the two plots of FIGS. 7-8 are on the same scale. In FIG. 9, the profile of the transition section 232 of the teat cup liner 200 in FIGS. 2-3 is shown as a dashed line; the profile of the transition section 332 of the teat cup liner 300 in FIGS. 4 and 6 is shown as a solid line. The difference in the slopes of the two transition sections 232 and 332 translates to a transition section 332 that is nearly three times as long as the transition section 232, and a significantly longer circular or substantially circular section of the liner 300 that can collapse more completely and/or effectively around the teat. This effect may be provided by similar liners with transition sections having a slope that is >0.14, but ≤0.3. For example, a slope of 0.2 translates to a transition section 332 that is about twice as long as the transition section 232, and a slope of 0.25 translates to a transition section 332 that is about 50% longer than the transition section 232.

The walls 338*a*-*c* and 339 in the triangular section 334 and the transition section 332, respectively, may have a variable thickness or a fixed or constant thickness. When all of the walls 339 have a fixed or constant thickness, the slope, graduation or narrowing of the transition section 332 can be measured using the inner surface(s) or outer surface(s) of the transition section 332. Typically, the fixed or constant thickness of the walls 339 is 1.0-5.0 mm or any value or range of values therein (e.g., 2.0-2.5 mm), but the invention is not limited to this range. On the other hand, when one or more of the walls 339 have a variable thickness, the slope, graduation or narrowing of the transition section 332 should be measured using the inner surface(s) of the transition section 332. The walls 338*a*-*c* in the triangular section 334 may have a thickness in the same range as the walls 339 in the transition section 332, but the thickness of the walls 338*a*-*c* may be the same as or different from the thickness of the walls 339.

In embodiments for use with cows, the diameter of the transition section 332 at the interface with the attachment section 310 may be from 20 to 30 mm or any diameter or range of diameters therein (e.g., 25 mm), and the diameter of the transition section 332 at the interface with the triangular section 334 may be from 14 to 22 mm or any diameter or range of diameters therein (e.g., 18 mm), but the invention is not so limited. The diameter of the transition section 332 at the interface with the triangular section 334 is less than the diameter of the transition section 332 at the interface with the attachment section 310, typically by 4 to 8 mm, but the invention is not limited to this range.

The tube section 320 may have a length $L_5$ of from 120 to 180 mm, or any length or range of lengths therein (e.g., 135-165 mm). Alternatively, the length of the tube section 320 may be 40-60% (or any percentage or range of percentages therein, such as 45-55%) of the total length of the teat cup liner 300. The tube section 320, which generally extends through an opening in the teat cup shell, includes a connection mechanism 322 that connects the tube section 320 to another tube or hose (not shown), in turn connected to another structure in the milking apparatus, such as a milking claw (see, e.g., FIG. 10).

In one example, the connection mechanism 322 comprises a series of identical ridges or rings 324*a*-*j* immediately adjacent to one another, circumscribing the exterior surface of the tube section 320. As shown, the ridges or rings 324*a*-*j* have a semi-circular cross-section, but the invention is not so limited. For example, the ridges or rings 324*a*-*j* can have a triangular cross-section (thereby forming a sawtooth-like profile), a rectangular cross-section with a gap between adjacent ridges or rings 324, etc. The height (or thickness) of the ridges or rings 324*a*-*j* may be 0.5-3.0 mm or any value or range of values therein (e.g., 1.0-1.5 mm), although the invention is not so limited. Given that the function of the connection mechanism 322 is to connect the tube section 320 to a hose or conduit having the same or a larger inner diameter than the outer diameter of the distal end 326 of the tube section 320, the ridges or rings 324*a-j* should have a height that is greater than the difference between the outer diameter of the distal end 326 and the inner diameter of the hose or conduit. In addition, the connection mechanism 322 as shown includes 10 ridges or rings 324*a-j*, although such a connection mechanism may comprise or consist of a different number of ridges or rings 324 (e.g., from 1 to 20, or any integer number or range of integer numbers therein, such as 4-12).

The tube section 320 may have a width or diameter of from 1.5-3.0 cm (or any width/diameter or range of widths/diameters therein, such as 1.8-2.5 cm), and a wall thickness (other than or outside the connection mechanism 322) of 2.5-7.5 mm (or any thickness or range of thicknesses therein, such as 4.0-6.0 mm), but the invention is not so limited. In addition, the connection mechanism 322 may have a width or diameter of from 1.8-3.6 cm (or any width/diameter or range of widths/diameters therein, such as 2.0-3.0 cm), and a thickness (including the ridges or rings 324) of 3.0-10 mm (or any thickness or range of thicknesses therein, such as 5.0-7.0 mm), but the invention is not so limited here, either. In general, the wall thickness of the connection mechanism 322 is greater than the wall thickness of the remainder of the tube section 320, for example by 0.5-2.0 mm, but the invention is not limited to values in this range.

The teat cup liner 300 may have an overall length of from 240 to 350 mm, for example in embodiments designed for use with cows. However, for different species of mammals, the teat cup liner 300 may have a different overall length.

Exemplary Teat Cup and Milking Apparatus Including the Present Teat Cup Liner

Figure 10:
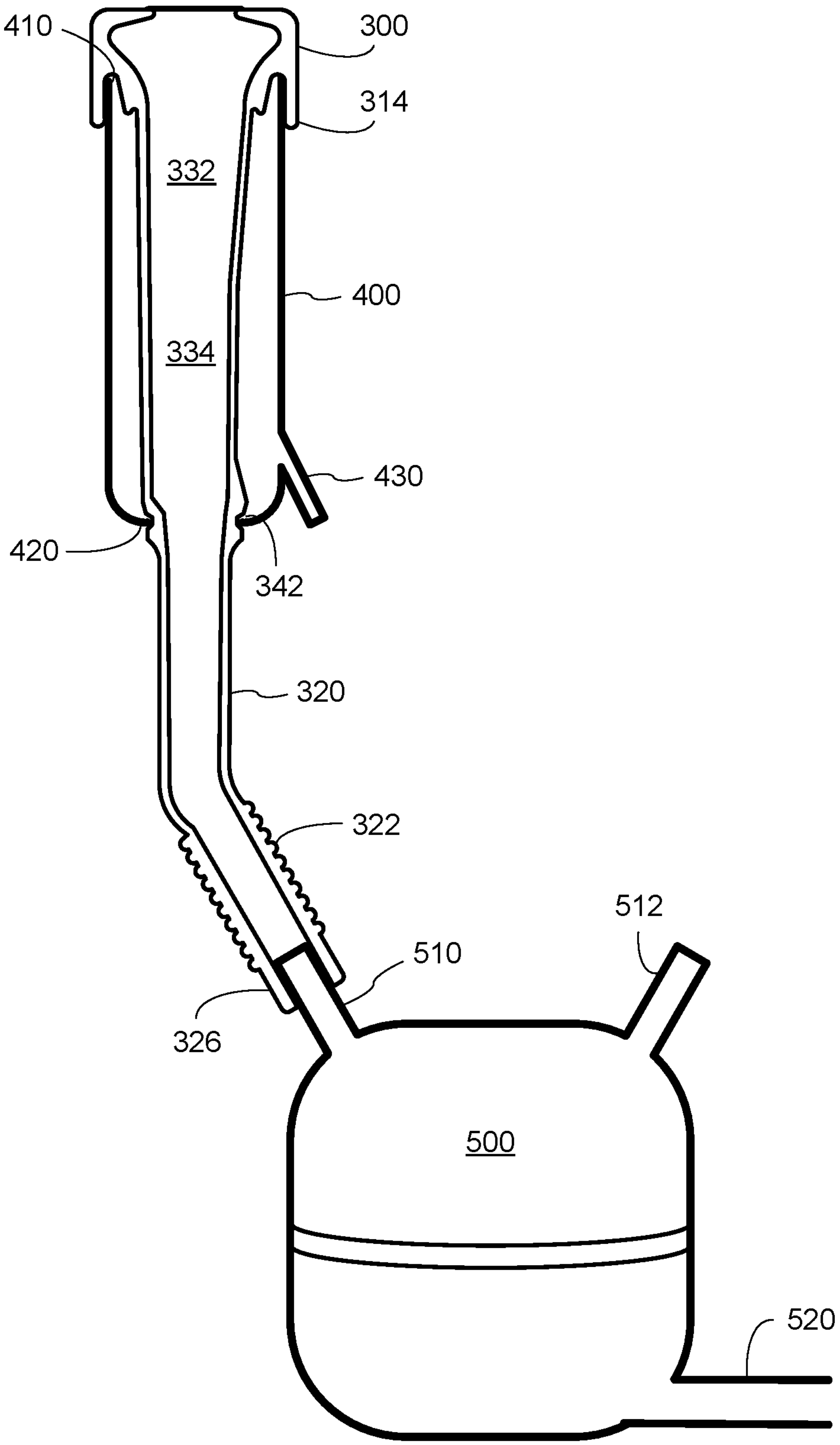
FIG. 10 is a diagram showing a teat cup and milking apparatus in accordance employing an exemplary teat cup liner of according to an embodiment of the present invention.

FIG. 10 shows an exemplary teat cup and milking apparatus, including the present teat cup liner 300. The teat cup includes the teat cup liner 300 and a teat cup shell 400. The teat cup shell 400 includes a substantially cylindrical body having a length slightly longer than the barrel 330 of the teat cup liner 300. The teat cup shell 400 also includes an upper rim 410 defining an opening into which the teat cup liner 300 is inserted, and a lower rim 420 defining an opening through which the tube section 320 of the teat cup liner 300 is drawn. The upper rim 410 fits into and/or under the lip 314 of the mouthpiece/attachment section 310. The lip 314 has an inner diameter that matches/equals or is slightly less than the outer diameter of the upper rim 410 so that the attachment section 310 fits securely onto the top of the teat cup shell 400. The lower rim 420 fits into and/or is mated with the circumferential groove 342, thereby securing the teat cup liner 300 in the teat cup shell 400.

The teat cup shell 400 also has a vacuum connector 430 for connecting a vacuum line (not shown). The vacuum line attached to the vacuum connector 430 applies a periodic or cyclical vacuum to the outside of the teat cup liner 300 in the teat cup shell 400.

The exemplary milking apparatus includes the teat cup and a milking claw 500. The tube section 320 connects to the milking claw 500 via a connector 510. The milking claw 500 generally has four such connectors, two of which (510 and 512) are shown. Thus, the present milking apparatus may include four teat cups, each including the present teat cup liner 300 in the teat cup shell 400. The milking claw 500 collects milk from the four teat cups and outputs the collected milk through a long hose 520 to a larger collection vessel.

Exemplary Methods

The present invention further relates to methods of making the present teat cup liner and using the present milking apparatus. For example, the teat cup liner generally comprises a rubber, a rubber blend, or other organic or organosilicone (polysiloxane) polymer or polymer mixture. Therefore, the teat cup liner may be made by molding (e.g., injection molding).

In one variation, the method of making the present teat cup liner may comprise mixing a rubber and/or polymer (or a blend or other combination thereof) to form a molding composition, placing the molding composition in a mold having the shape of the teat cup liner, curing the molding composition in the mold to form the teat cup liner, then releasing the cured teat cup liner from the mold. The mold may be an injection mold, and the molding composition may be placed in the mold by injecting the molding composition into the mold.

Another method may relate to collecting milk from a milk-producing mammal. Such a method may comprise attaching a plurality of teat cups to the teats of the mammal, applying one or more vacuums to the interior of the teat cups to remove the milk from the mammal, and collecting the milk in a container or vessel. Each of the teat cups includes a teat cup shell and the present teat cup liner, secured therein. In some embodiments, the method may further comprise inserting the teat cup liners into the teat cups prior to attaching the teat cups to the teats of the mammal.

In other or further embodiments, the method of collecting milk may further comprise flowing the removed milk from the teat cups into a milking claw and/or flowing the milk from the milking claw into the container or vessel. In some embodiments, applying one or more vacuums to the interior of the teat cups comprises applying a continuous vacuum to the interior of the teat cup liner, and applying a pulsed or cyclical vacuum to the space between the teat cup liner and the teat cup shell.

In further embodiments, the method may further comprise passing the milk through a meter to measure the amount of milk removed from the mammal. The meter may be as described in U.S. Pat. No. 10,159,213, the relevant portions of which are incorporated herein by reference.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A teat cup liner, comprising:

a) an attachment section having an opening therein;

b) a barrel joined to and in fluid communication with the attachment section, the barrel comprising a transition section and a triangular section, wherein:

i) a combined length of the attachment section and the transition section is (i) from 5.5 to 8.5 cm long, (ii)

an average teat length (after elongation)±20%, (iii) the average teat length (after elongation) minus a minimum uniform pressure length, ±20%, or (iv) 40-65% of a combined length of the attachment section and the barrel; and ii) the transition section has a surface with a slope of less than 0.3 and at least 0.05, where a radius of the transition section is measured using an inner surface of the transition section, the slope is defined by a change in the radius of the barrel in the transition section relative to a length of the transition section, and the transition section has a graduated or narrowing inner diameter along a length of the barrel, from the attachment section to the triangular section; and c) a tube section, joined to and in fluid communication with the barrel, the tube section including a connection mechanism.

2. The teat cup liner of claim 1, wherein the transition section is from 6.3 to 7.7 cm long.

3. The teat cup liner of claim 1, wherein the combined length of the attachment section and the transition section is 48-57% of the combined length of the attachment section and the barrel.

4. The teat cup liner of claim 1, wherein the slope of the surface of the transition section is less than 0.2.

5. The teat cup liner of claim 1, wherein the combined length of the attachment section and the transition section is (X*Y)−Z, where X is the average teat length, Y is a teat elongation factor of at least 1.3, and Z is (i) the minimum uniform pressure length and (ii) at least 1 mm.

6. The teat cup liner of claim 1, wherein the transition section has a circular or substantially circular cross-section at a first interface with the attachment section and a triangular or substantially triangular cross-section at a second interface with the triangular section.

7. The teat cup liner of claim 1, wherein the triangular section has a substantially triangular cross-section and consists essentially of three substantially planar triangular regions, each at about a 120° angle relative to the other two substantially planar triangular regions.

8. The teat cup liner of claim 7, wherein the barrel further comprises a first rib between first and second ones of the three substantially planar triangular regions, a second rib between the second one and a third one of the three substantially planar triangular regions, and a third rib between the first one and the third one of the three substantially planar triangular regions.

9. The teat cup liner of claim 1, wherein the teat cup liner has a central axis along a length thereof, and each of the attachment section and the tube section has an interior that is radially symmetrical about the central axis.

10. The teat cup liner of claim 1, wherein the attachment section comprises a teat contact section and a lip extending from an outermost circumferential surface of the teat contact section, the teat contact section being radially symmetrical and having a cross-section that is cylindrical, toroidal, conical, bell-shaped, or a combination thereof, and the lip being configured to secure the teat cup liner to a corresponding teat cup.

11. The teat cup liner of claim 10, wherein the barrel has (i) a first interface between the transition section and the attachment section that is coplanar with a lowermost surface or edge of the lip and (i) a second interface between the triangular section and the tube section that is within 10% of a midpoint along a length of the teat cup liner.

12. The teat cup liner of claim 11, wherein the inner diameter of the transition section at the first interface is greater than a diameter of the tube section between the second interface and the connection mechanism.

13. The teat cup liner of claim 12, wherein the diameter of the tube section between the second interface and the connection mechanism is greater than the diameter of the tube section at the connection mechanism.

14. The teat cup liner of claim 11, further comprising a circumferential groove in an exterior surface of the second interface, the circumferential groove being configured to receive an edge of the corresponding teat cup.

15. The teat cup liner of claim 1, wherein the attachment section has a length of from 25 to 35 mm, the barrel has a length of from 80 to 120 mm, the tube section has a length of from 120 to 180 mm, and the teat cup liner has a length of from 240 to 350 mm.

16. The teat cup liner of claim 1, wherein the length of the transition section and a length of the triangular section equals a length of the barrel.

17. A teat cup, comprising:

a) teat cup liner of claim 1; and b) a teat cup shell, configured to securely and sealingly hold the teat cup liner therein and apply a vacuum to an exterior of the teat cup liner.

18. A milking claw, comprising:

a) a plurality of the teat cups of claim 17; and b) a manifold, configured to receive a fluid from the tube sections of the teat cup liners and combine the fluid into a single output flow.

19. The teat cup liner of claim 1, wherein the slope is defined by a decrease in the radius of the barrel in the transition section relative to the length of the transition section.

20. The teat cup liner of claim 16, wherein the attachment section is connected to the transition section, the transition section is connected to the triangular section, and the triangular section is connected to the tube section, and the attachment section has a length is 20-30% of the combined length of the attachment section and the transition section.

21. A method of making a teat cup liner, comprising:

a) injecting a rubber material into a mold having a shape of the teat cup liner of claim 1;

b) heating or otherwise vulcanizing the rubber material in the mold; and c) releasing the vulcanized rubber material in the shape of the teat cup liner from the mold.

22. A method of milking a milk-producing mammal, comprising:

a) applying a teat cup having a teat cup liner of claim 1 therein to a teat of the mammal;

b) applying a continuous vacuum to an interior of the tube section; and c) applying a pulsed or periodic vacuum to an exterior of the teat cup liner.

* * * * *